Feb. 12, 1957 J. M. MACY 2,780,883
DEVICE FOR ANCHORING A FISHING REEL
Filed June 11, 1954
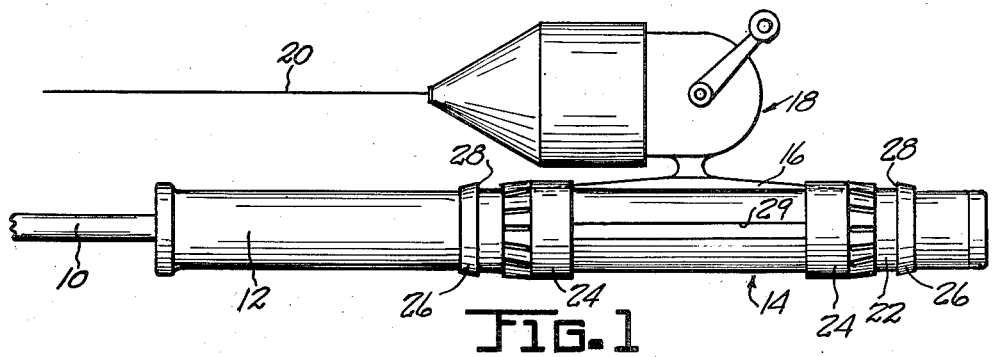
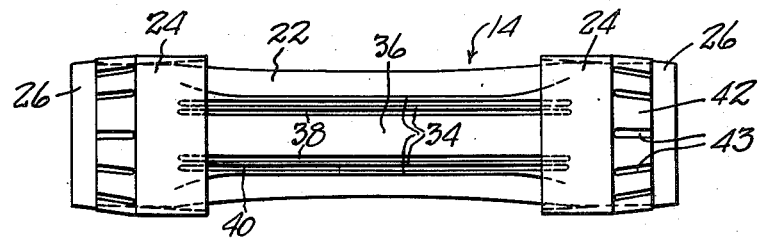
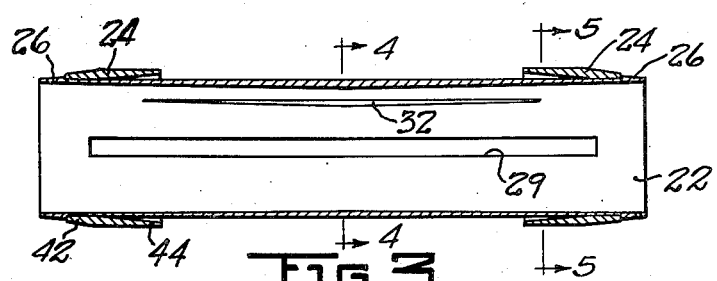
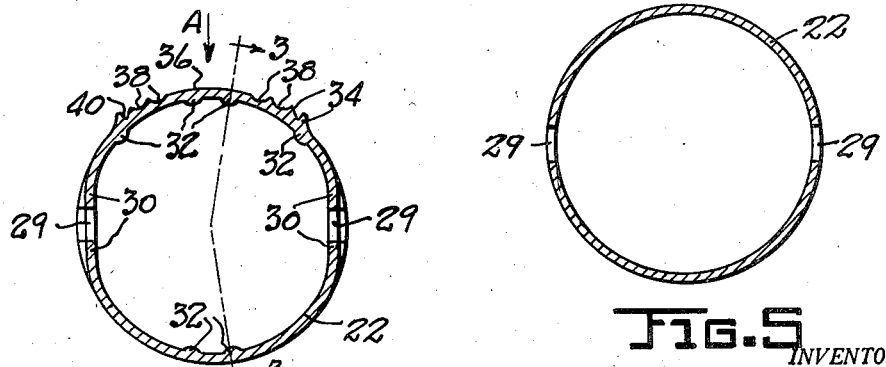
INVENTOR.
JOHN M. MACY.
BY
ATTORNEY United States Patent Office 2,780,883
Patented Feb. 12, 1957

2,780,883

DEVICE FOR ANCHORING A FISHING REEL

John M. Macy, South Bend, Ind., assignor to South Bend Bait Company, South Bend, Ind., a corporation of Indiana Application June 11, 1954, Serial No. 436,112

5 Claims. (Cl. 43—22)

This invention relates to a device for anchoring a fishing reel, and more particularly to a device for anchoring a fishing reel to the hand grip portion of a fishing rod of either the spinning type or the fly type.

Various types of devices have been provided heretofore for anchoring the base of a fishing reel, such as a spinning reel, to the hand grip of a fishing rod. One of these types contemplates the engagement with the rod handle of a base plate carried by the reel and the use of retainer rings slidable upon the longitudinal tapered reel base so as to produce a wedging action which causes firm abutment of the base of the reel with the rod handle. Devices of this type may include a slotted sleeve embracing the handle and providing means to prevent shifting of the reel base out of longitudinal alignment with the rod handle, or may simply consist of a pair of rings without such a sleeve. In either case, the direct engagement of the base of the reel with the fishing rod handle, which is usually formed of cork and hence readily cut or gouged, results in injury to the handle and also results in an anchorage or abutment lacking strength and stability. Another type of reel anchoring means commonly employed utilizes a split sleeve which is constricted incident to clamping pressure applied upon anchoring the reel seat, so that the cork handle is compressed or otherwise deformed. Both of the prior types of reel seats are subject to rotative slippage of the reel so that its elongated base is misaligned with reference to the rod in the event the clamping action exerted is light enough to permit such slippage, that is, in the event the clamping action is not so great as to cause compressing or gouging of the material of which the handle is formed.

It is the primary object of this invention to provide a device which will overcome the aforementioned and other deficiencies of devices which have been available commercially heretofore.

A further object is to provide a device of this character which is light in weight, which is non-corrosive, which holds a reel securely and which accommodates the clips or base plates of many spinning reels of which 142 foreign types are currently offered for sale in addition to various domestic units.

A further object is to provide a device of this character having a sleeve on which the clip or base plate of a reel has continuous bearing, said sleeve having longitudinal internal ribs tapered from a mid-point thereof to its ends and serving to hold the sleeve from rotating on the handle of the fishing rod.

A further object is to provide a device of this character having a sleeve provided with a pair of longitudinal slots and slightly out of round at the sides adjacent the slots and spaced from the points at which the base plate of the reel engages the sleeve, which construction provides four bearing points for the sleeve and handle and accommodates pressing of the sleeve to the shape of the grip without distortion of the grip or handle of the fishing rod.

A further object is to provide a device of this character having exterior longitudinal ribs providing longitudinal grooves adapted to receive the edges of a reel base plate or clip, and at least the outer longitudinal retainer ribs being tapered longitudinally similarly to the taper of the clip and to allow a retaining band or ring to slip over the clip of the reel to facilitate application of the retainer sleeves over the clip or base of the reel.

A further object is to provide a device of this character which is formed of synthetic resin, such as "Nylon" and which has retaining shoulder rings at the ends of the sleeves to normally prevent the bands from slipping from the sleeve, but which is subject to expansion when heated to enable the rings to be slipped over the sleeve ends.

Other objects will be apparent from the following specification.

In the drawing:

Fig. 1 is a view of the device in operative position mounting a reel;

Fig. 2 is a plan view of the device taken in the direction of the arrow A of Fig. 4;

Fig. 3 is a longitudinal sectional view of the device taken on line 3—3 of Fig. 4;

Fig. 4 is an enlarged transverse sectional view taken on line 4—4 of Fig. 3 but omitting the retainer ring; and Fig. 5 is an enlarged transverse sectional view taken on line 5—5 of Fig. 3 but omitting the retainer ring.

Referring to the drawing which illustrates the preferred embodiment of the invention, the numeral 10 designates a fishing rod having an enlarged hand grip portion 12, preferably formed of cork. The fishing rod may be of a fly rod type or of the spinning reel type, and blade of the rod 10 may be formed of any material found suitable, such as synthetic resin reinforced with fiberglass, metal, laminated bamboo, or the like. My improved reel seat is designated by the numeral 14 and is mounted upon a hand grip 12 and serves as a means to anchor and secure to the grip 12 the clip or base 16 of a fishing reel 18, here shown as a reel of the so-called "spinning" type, which may be operated to wind the line 20 and to pay out the same during the fishing operation.

My improved reel anchoring device comprises a sleeve 22 and a pair of retainer rings 24. Both the sleeve 22 and the ring 24 preferably are formed from "nylon," namely from one of a series of polyamide resins made by the polymerization of a hexamethylenediamine salt of adipic acid. It will be understood, however, that the sleeve and the ring may be formed from other materials than those stated, and may be formed from different materials rather than the same material. Examples of other materials which may be used are resins reinforced by fiber glass, fiber glass laminations bonded by resin, aluminum, brass, or steel.

The sleeve 22 has enlarged end portions 26 defining a shoulder 28 at the inner end of each enlargement. The enlargements 26 are preferably tapered, as seen in Fig. 3, with the large diameter end innermost. The end portions of the sleeve are of substantially true circular form, as illustrated in Fig. 5. A pair of elongated longitudinal slots 29 are formed in the sleeve 22 in substantially diametrically opposed relation. Said slots extend for the major portion of the length of the sleeve, preferably terminating slightly inwardly spaced from the enlarged end portions 26, as seen in Fig. 3. Each slot 29 will preferably be of rectangular shape, that is, will be of substantially uniform width throughout its length. The portions of the sleeve adjacent to the slot are offset inwardly at 30, as seen in Fig. 4, so as to be slightly out of round. This condition is somewhat exaggerated in Fig. 4 for purposes of illustration.

A plurality of longitudinal internal ribs 32 are formed in the sleeve in spaced relation and arranged substantially as illustrated in Fig. 4. That is, two pairs of closely spaced internal ribs 32 are located in substantially diametrically opposed relation, with said pairs substantially equispaced from the longitudinal slots 29. Other internal ribs are formed substantially midway between one of said pairs of the slots 29. The arrangement is preferably such that four of the ribs 32 will be formed in one of the halves of the sleeves, that half being the one which is engaged by the reel base plate 16 in use. Each of the ribs 32 is preferably of a length shorter than the slots 29 and is substantially centered lengthwise in the sleeve. The arrangement is such that the ribs 32 are of maximum depth at their mid-point and taper toward their ends, as seen in Fig. 3. In the form shown in which the parts are formed of "nylon," the ribs or ridges have a maximum depth of approximately .01 inch.

Exterior longitudinal ribs or ridges 34 are formed on the sleeve 22 and define between them a smooth arcuate surface 36 upon which the clip or base plate 16 of the reel is adapted to bear. A plurality of longitudinal grooves 38 extend between the ribs 34, and an outermost groove 40 having a substantially V-shape in cross-section and a greater depth than the grooves 38 is provided to receive the marginal longitudinal edges of the reel base 16. It will be understood, however, that reels of different sizes may have base plates of different widths, and the provision of multiple grooves 38 and 40 in association with the ribs 34 serve to accommodate a variety of widths of reel bases or clips. The ribs 34 extend substantially the same length as the internal ribs 32 and substantially coincide therewith as to location longitudinally of the sleeve. The circumferential orientation of the internal and external ribs is seen in Fig. 4, from which it will be observed that two of the internal ribs 32 are located below the reel clip engaging surface 36, and the other two adjacent internal ribs 32 are located adjacent the outermost longitudinal external ribs 34.

The rings 24 are preferably of the cross-sectional shape illustrated in Fig. 3, with the end portion 42 thereof which is positioned outermost having a substantially cylindrical inner surface of a size to have a snug sliding fit upon the end portions of the sleeve 22, and having substantially frusto conical outer end portions having a surface which preferably is interrupted by longitudinal grooves 43 spaced uniformly about its circumference and serving to provide a finger-engaging portion on the end of each ring. The inner end portion 44 of each ring preferably has a substantially cylindrical outer surface and a frusto conical inner surface of maximum diameter at its inner end. The dimension of each ring will be such as to accommodate and fit over an end portion of the base plate or clip 16 of the reel which commonly is slightly tapered so as to be of minimum thickness at its ends.

The sleeve 22, with its rings 24 mounted thereon and retained thereon by the shoulders 28, is adapted to have a snug sliding fit upon the rod handle 12. Thus the sleeve 22 may be applied to the rod handle 12 by simply sliding it endwise upon that handle to the position desired. In this connection the circular shape of the ends of the sleeve 22 facilitate the sliding action upon starting, and as the inset portions 30 engage the handle 12 they are flexed outwardly to provide a snug fit thereof against the handle. It will also be apparent that the shape of the internal ribs 32, tapering from the ends to the center thereof, facilitates the sliding application of the sleeve to the handle. The reel base plate or clip 16 is then seated on the surface 36 and is oriented in true longitudinal direction by the ribs 34 and the grooves 38, 40. The rings 24 are then slid endwise one at a time, over the tapered reel base or clip 16 to effect a firm anchorage of said base plate upon the sleeve 22.

The external surface of the sleeve 22 and the internal surfaces of the sleeves 24 will preferably be treated to provide a coefficient of friction sufficiently high to insure a grip of high efficiency between the parts 22 and 24 and the reel clip or base plate 16. In cases where the parts are formed of "nylon," or of other molded material, the cavities of the molds for forming the parts 22 and 24 will be vapor blasted or sand blasted to provide the desired surface texture. If the parts are formed of metal, the exterior surfaces of the sleeve and the interior surfaces of the ring may be sand blasted or otherwise striated to produce the desired coefficient of friction.

The rings 24 having an internal taper at their end portions 44 are permitted to tip to engage over the clip 16 easily and also conform to the taper of said clip. When formed of a plastic, such as "nylon," these rings can stretch to conform to the shape of the clip of the reel. This stretching action enables the bands to take positions positively anchoring the reel clip to the sleeve. The band, and similarly the sleeve if formed of "nylon," will return to normal shape after use and will avoid the taking of a permanent set as might occur if the parts were formed of metal. Another advantage of forming the parts from "nylon" is that the molding thereof avoids the occurrence of rough edges as occurs with metal parts, and also avoids the chilly feeling which metal has on a cold day as a result of the fact that metal has a different heat transfer property than does "nylon."

The rings may be slid to disengage the reel clip 16 by sliding the same endwise upon the sleeve 22 preferably with a slight rotation. The rings are held effectively against release from the sleeve by the shoulder 28 so that the user need not be concerned about holding the rings in place as he is manipulating the reel to apply it to operative position or to remove it from the rod.

While a preferred construction of the device has been illustrated and described, it will be understood that changes in the construction may be made within the scope of the appended claims without departing from the spirit of the invention.

I claim:

1. A device for anchoring the base plate of a fishing reel on a compressible fishing rod handle, comprising an elongated flexible sleeve adapted to encircle said handle, said sleeve being freely slidable along the length of the handle and having a pair of opposed elongated longitudinal slots formed intermediate the ends thereof and defining two longitudinal portions, a pair of spaced longitudinal external ribs carried by one longitudinal portion and defining a portion engageable by a reel base portion, said ribs being substantially equally spaced from said slots, and a pair of rings slidable on said sleeve and adapted to overlie the opposite ends of said reel base plate to wedgingly retain said base portion in a predetermined position on said sleeve and to draw into firm frictional engagement with said rod handle the longitudinal portions of said sleeve separated by said slots, and a longitudinal internal rib on said sleeve located adjacent said reel base engaging portion and being adapted to be pressed into said rod handle to resist rotation of said sleeve on said handle.

2. A device for anchoring the base plate of a fishing reel on a compressible fishing rod handle, comprising an elongated sleeve adapted to encircle said handle and being freely slidable along the length of said handle, said sleeve having a pair of opposed elongated longitudinal slots formed intermediate the ends thereof and defining spaced longitudinal flexible portions, a pair of spaced longitudinal external shoulders carried by one longitudinal portion and defining a portion engageable by a reel base plate, said shoulders being substantially equally spaced from said slots, and a pair of rings slidable on said sleeve and adapted to overlie the opposite ends of said reel base plate to wedgingly anchor said base plate in a selected position on said sleeve and to draw into frictional anchoring engagement with said rod handle the longitudinal flexible portions of said sleeve separated by said slots, said sleeve having the portions thereof adjacent said slots projecting inwardly and pressing against said handle in both anchoring and reel base releasing positions of said rings.

3. A device for anchoring the base plate of a fishing reel on a compressible fishing rod handle, comprising an elongated sleeve adapted to encircle said handle and being freely slidable along the length of said handle, said sleeve having a pair of opposed elongated longitudinal slots formed intermediate the ends thereof to define two longitudinal flexible sleeve portions, one of said sleeve portions having a pair of spaced longitudinal external shoulders defining a portion adapted to underlie and position a reel base plate, said shoulders being substantially equally spaced from said slots, and a pair of rings slidable on and encircling said sleeve and adapted to overlie the opposite ends of said reel base plate to wedgingly anchor said base plate in a selected position on said sleeve and to simultaneously draw said longitudinal sleeve portions radially inwardly into firm frictional anchored engagement with said rod handle.

4. A device for anchoring the base plate of a fishing reel on a compressible fishing rod handle, comprising an elongated sleeve adapted to encircle said handle and being freely slidable along the length of said handle, said sleeve having a pair of opposed elongated longitudinal slots formed intermediate the ends thereof and defining two longitudinal flexible portions, a pair of spaced longitudinal external shoulders carried by one longitudinal portion and defining a portion engageable by a reel base plate, said shoulders being substantially equally spaced from said slots, a pair of rings slidable on said sleeve and adapted to overlie the opposite ends of said reel base plate to wedgingly anchor said base plate in a selected position on said sleeve and to draw into firm frictional anchoring engagement with said rod handle the flexible portions of said sleeve separated by said slots, and a plurality of shallow longitudinal internal ribs on said sleeve spaced from said slots and adapted to be pressed into said handle to resist rotation of said sleeve on said handle, said ribs being of greatest depth between their ends and tapering toward each end thereof.

5. A device for anchoring the base plate of a fishing reel on a compressible fishing rod handle, comprising an elongated flexible sleeve adapted to encircle said handle and being freely slidable along the length of said handle, said sleeve having a pair of opposed elongated longitudinal slots formed intermediate the ends thereof and defining two longitudinal portions, a pair of spaced longitudinal external ribs on one longitudinal portion defining a portion engageable by a reel base plate, said ribs being substantially equally spaced from said slots, a pair of rings slidable on said sleeve and adapted to overlie the opposite ends of said reel base plate to wedgingly anchor said base plate in a selected position on said sleeve and to draw into firm frictional anchoring engagement with said rod handle the portions of said sleeve separated by said slots, said longitudinal external ribs each having a plurality of longitudinal grooves therein for positioning said reel base, one of said longitudinal sleeve portions having an internal projection adapted to be pressed into said handle to resist rotation of said sleeve on said handle.

References Cited in the file of this patent
UNITED STATES PATENTS

| | | |
|---|---|---|
| 235,017 | Prichard | Nov. 30, 1880 |
| 235,513 | Chubb | Dec. 14, 1880 |
| 333,135 | King | Dec. 29, 1885 |
| 402,594 | Hook | May 7, 1889 |
| 426,616 | Goggin | Apr. 29, 1890 |
| 441,126 | Boone | Nov. 25, 1890 |
| 834,554 | Bartlett | Oct. 30, 1906 |
| 849,231 | Gorham | Apr. 2, 1907 |
| 888,075 | Eshnaur | May 19, 1908 |
| 953,775 | Becraft | Apr. 5, 1910 |
| 1,339,238 | Tillman | May 4, 1920 |
| 1,970,641 | Bassett | Aug. 21, 1934 |
| 2,076,629 | Edwards | Apr. 13, 1937 |
| 2,409,940 | Kay | Oct. 22, 1946 |
| 2,583,831 | Goergen | Jan. 29, 1952 |